United States Patent

[11] 3,557,925

| [72] | Inventor | Ralph A. Zulauf<br>Scott Township, Allegheny County, Pa. |
|---|---|---|
| [21] | Appl. No. | 735,257 |
| [22] | Filed | June 7, 1968 |
| [45] | Patented | Jan. 26, 1971 |
| [73] | Assignee | United States Steel Corporation<br>a corporation of Delaware |

[54] HYDRAULIC BRAKE FOR CONVEYOR ROLLERS
2 Claims, 3 Drawing Figs.

[52] U.S. Cl. ................................................. 193/35
[51] Int. Cl. ........................................... B65g 13/075
[50] Field of Search ........................................... 193/35,
35A; 74/782; 188/90

[56] References Cited
UNITED STATES PATENTS

| 3,352,397 | 11/1967 | Becker et al ................. | 193/35A |
| 3,376,965 | 4/1968 | Tregoning et al ............. | 193/35A |
| 1,770,796 | 12/1969 | Miles ........................... | 188/90(X) |

FOREIGN PATENTS

| 1,270,491 | 6/1968 | Germany .................... | 193/35A |

Primary Examiner—Andres H. Nielsen
Attorney—Donald S. Ferito

ABSTRACT: The invention relates to a braking system for gravity-type idler roller conveyors which functions to control the speed of roller rotation which is caused by the movement of material along the conveyor. The disclosed apparatus includes a centrifugal hydraulic pump mechanically connected with one or more of the idler rollers of the conveyor. The pump is connected with an idle hydraulic circuit having a throttle valve, orifice, or other control means therein for regulating the flow of hydraulic fluid therealong. Through adjustment of the control means, any desired resistance against roller rotation may be established.

PATENTED JAN 26 1971    3,557,925

INVENTOR
RALPH A. ZULAUF

By Donald S. Ferito
Attorney

HYDRAULIC BRAKE FOR CONVEYOR ROLLERS

The present invention relates generally to material handling equipment, and more particularly, to a braking apparatus especially suitable for decelerating or governing the rotation of one or more of the idler rolls of an inclined roller conveyor.

A gravity-type or inclined roller conveyor utilized for transporting articles or loads from one point to another must have a pitch which is sufficient to overcome frictional resistance and to ensure uninterrupted movement of the article or load along the conveyor. Prior to my invention, gravity-type roller conveyors were usually limited to approximately 50 feet in length due to the inability to control the velocity of an article or load traveling over a conveyor of greater length having sufficient pitch to keep the article or load moving.

Various means have been used in attempts to prevent the runaway of articles or loads traveling along gravity-type roller conveyors. One of such means was in the form of spring-set air release friction brakes disposed at various intervals along an idler roller conveyor. With this type of device, the braking capacity had to be adjusted to compensate for any significant variation in load weight and/or momentum, thus limiting conveyor material-handling capacity to specific weight tolerances for practical use so that devices of this type were not entirely satisfactory. Other devices of which I am aware that have been tried for effecting control of the rollers of a gravity-type conveyor have not produced entirely satisfactory results in controlling the velocities of material traveling along the conveyor.

My invention contemplates the utilization of fluid-brake means for governing or decelerating idler rollers of an inclined roller conveyor which would provide deceleration of the conveyor rollers directly proportional to the weight of the load passing thereover. The hydraulic brake system of my invention would allow wide variation in load weight and would also provide positive control of the load or article being conveyed over the entire length of the conveyor run so that heretofore necessary restrictions on conveyor length could be discarded.

It is, accordingly, the primary object of my invention to provide a hydraulic brake for conveyor rollers whereby the speed of rotation of the conveyor rollers can be easily governed.

It is a more specialized object of my invention to provide a hydraulic brake for conveyor rollers which includes a centrifugal hydraulic pump connected in driving relation with one or more of the idler rollers of the conveyor; and idle hydraulic circuit connected with the pump; and, control means such as a throttle valve, orifice, etc., in the circuit for controlling the flow of fluid therealong, whereby the rotation of the centrifugal pump and the idler rollers connected therewith are governed.

These and other objects of my invention will become more apparent from the following description and the enclosed drawing in which.

Figure 1:
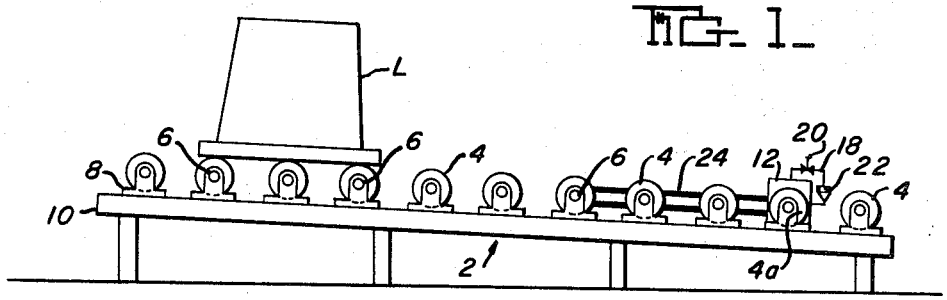
FIG. 1 is a side elevational view of an inclined roller conveyor having the hydraulic brake of the invention incorporated therein.

Referring more particularly to the drawing, reference numeral 2 designates generally a gravity type or inclined conveyor having a plurality of idler rollers 4 arranged in spaced parallel relation for transporting a load or article L from the upper end of the conveyor to its lower end. The shafts 6 of the idler rollers 4 are journaled in antifriction bearings 8 disposed along two side frame members 10 of the conveyor 2.

Figure 2:
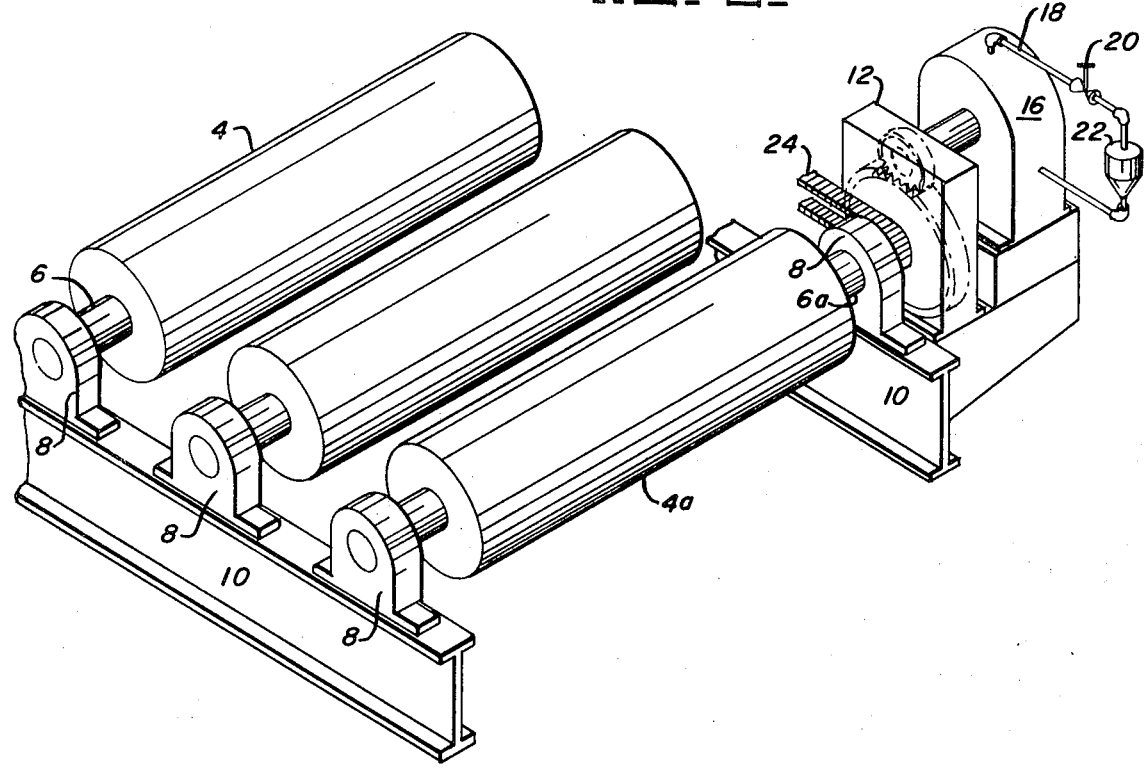
FIG. 2 is an enlarged partial view in perspective with parts omitted for clarity showing the hydraulic brake of the invention connected with the idler rollers of the conveyor.

As best shown in FIG. 2, a shaft 6a of one of the idler rollers 4, designated 4a, is extended and is connected with the shaft of a gear reduction unit 12 which, in turn, is connected with the rotor 14 of a centrifugal hydraulic pump 16. The pump 16 is connected with an idle, closed-pipe hydraulic circuit 18 which is provided with a flow control means, in the form of a throttle valve 20, and a reservoir 22. More than one idler roller of the conveyor may be connected with the centrifugal hydraulic pump, and be governed thereby, by means of a chain drive 24 or similar mechanical coupling. The connection of one or more of the idler rollers of the conveyor with the centrifugal hydraulic pump causes transmission of a continuous drive of rotating force to the pump when a load or article passes over the idler rollers of the conveyor.

Figure 3:
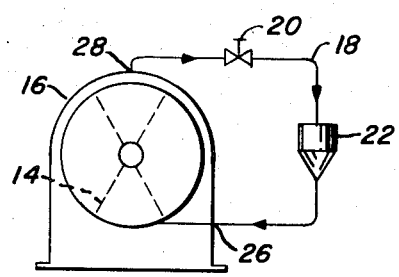
FIG. 3 is a schematic illustration of the hydraulic system of the brake of the invention.

In operation, the pump rotating force is clockwise, as viewed in FIG. 3. The hydraulic fluid enters the pump through an inlet port 26 and is carried toward an outlet port 28 of the pump by rotation of the pump rotor 14. The flow and pressure of the hydraulic fluid from the outlet port 28 is controlled by the throttle valve 20. Thus, as the load L moves down over the idler rollers 4 and 4a, rotation of the roller 4a and the other idler rollers drivingly connected therewith is governed or decelerated by the retarding action of the rotor 14 which, in turn, is governed by the throttle valve 20. After the hydraulic fluid passes through the throttle valve 20, it is directed to the reservoir 22 for recycling through the circuit.

It will be seen that the braking power of the hydraulic brake of the invention is directly proportional to the momentum (weight + speed) of the load traveling over the conveyor.

While I have shown but one embodiment of my invention, it will be apparent that other adaptations and modifications may be made without departing from the scope of the following claims.

I claim:

1. In a roller conveyor having a plurality of idler rollers disposed in spaced parallel relation, the improvement therewith of a centrifugal hydraulic pump connected in driving relation with one of said idler rollers, said pump including a pump shaft, said pump shaft projecting from said pump toward said one of said idler rollers, a gear on the projecting end of said pump shaft, a second gear on said idler roller, said gear being in mesh with said first-mentioned gear, an idle hydraulic circuit connected with said pump, control means in said circuit for varying the flow of fluid therealong whereby the rotation of said pump and said one of said idler rollers are governed.

2. Apparatus as defined by claim 1 in which at least one of said plurality of idler rollers is drivingly connected with said one of said idler rollers.